United States Patent
Li et al.

(10) Patent No.: US 10,756,802 B2
(45) Date of Patent: Aug. 25, 2020

(54) COMMUNICATION METHOD AND TERMINAL DEVICE

(71) Applicant: Huawei Technologies Co., Ltd., Shenzhen (CN)

(72) Inventors: Sainan Li, Chengdu (CN); Huang Huang, Shenzhen (CN); Yalin Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/414,247

(22) Filed: May 16, 2019

(65) Prior Publication Data

US 2019/0273550 A1 Sep. 5, 2019

Related U.S. Application Data

(63) Continuation of application No. PCT/CN2017/090356, filed on Jun. 27, 2017.

(30) Foreign Application Priority Data

Nov. 17, 2016 (CN) .......................... 2016 1 1013807
Apr. 6, 2017 (CN) .......................... 2017 1 0222042

(51) Int. Cl.
*H04L 23/02* (2006.01)
*H04B 7/06* (2006.01)
(Continued)

(52) U.S. Cl.
CPC .......... *H04B 7/0639* (2013.01); *H04B 7/063* (2013.01); *H04L 1/0057* (2013.01);
(Continued)

(58) Field of Classification Search
CPC ..... H04L 1/0054; H04L 1/005; H04L 1/1864; H04L 5/0023; H04B 7/0421; H04B 7/0639; H04W 71/044; H04W 72/042
(Continued)

(56) References Cited

U.S. PATENT DOCUMENTS

2012/0307726 A1 12/2012 Pi et al.
2013/0028186 A1 1/2013 Kim
(Continued)

FOREIGN PATENT DOCUMENTS

CN 102111208 A 6/2011
CN 104081828 A 10/2014
(Continued)

OTHER PUBLICATIONS

ZTE et al., "Considerations on SS block design", 3GPP TSG RAN WG1 Meeting #87, R1-1611268, Reno, USA, Nov. 14, 2016-Nov. 18, 2016, Nov. 13, 2016, XP051175249, 8 pages.
(Continued)

*Primary Examiner* — Khai Tran
(74) *Attorney, Agent, or Firm* — Slater Matsil, LLP

(57) ABSTRACT

A communication method and a terminal device are provided. The method includes: generating one or more radio frames, where each radio frame includes at least one multiplexing block, each multiplexing block includes a synchronization signal and a PBCH field, and the PBCH field includes information for indicating a beam; and then sending the radio frames to a terminal device.

21 Claims, 3 Drawing Sheets

(51) Int. Cl.
*H04L 1/00* (2006.01)
*H04L 5/00* (2006.01)
*H04W 72/04* (2009.01)
*H04L 27/26* (2006.01)
*H04L 5/14* (2006.01)

(52) U.S. Cl.
CPC .......... *H04L 5/0007* (2013.01); *H04L 5/0023* (2013.01); *H04L 5/0053* (2013.01); *H04L 5/0094* (2013.01); *H04L 27/26* (2013.01); *H04L 27/2613* (2013.01); *H04L 27/2692* (2013.01); *H04W 72/046* (2013.01); *H04W 72/0413* (2013.01); *H04B 7/0695* (2013.01); *H04L 5/0048* (2013.01); *H04L 5/1469* (2013.01)

(58) Field of Classification Search
USPC .......................... 375/262, 260, 266; 370/330
See application file for complete search history.

(56) References Cited

U.S. PATENT DOCUMENTS

| | | | |
|---|---|---|---|
| 2013/0155847 A1 | 6/2013 | Li et al. | |
| 2013/0195069 A1 | 8/2013 | Frederiksen et al. | |
| 2015/0372736 A1* | 12/2015 | Nammi | H04B 7/0617 370/329 |
| 2016/0050003 A1* | 2/2016 | Ko | H04B 7/0469 370/329 |
| 2016/0277081 A1* | 9/2016 | Wei | H04B 7/0639 |
| 2016/0277225 A1 | 9/2016 | Frenne et al. | |
| 2016/0308637 A1 | 10/2016 | Frenne et al. | |
| 2018/0302904 A1 | 10/2018 | Li et al. | |
| 2019/0173628 A1* | 6/2019 | Ko | H04W 72/0453 |
| 2019/0229961 A1* | 7/2019 | Gao | H04J 11/0073 |

FOREIGN PATENT DOCUMENTS

| | | |
|---|---|---|
| CN | 104115419 A | 10/2014 |
| WO | 2011136266 A1 | 11/2011 |

OTHER PUBLICATIONS

Intel Corporation, "On multiplexing between PSS and SSS", 3GPP TSG RAN WG1 Meeting #87, R1-1613046, Reno, USA, Nov. 14, 2016-Nov. 18, 2016, Nov. 14-18, 2016, XP051176993, 6 pages.

Qualcomm Inc., "Multi-beam SYNC design," 3GPP TSG RAN WG1 Meeting #86b, R1-1610159, Lisbon, Portugal, Oct. 10-14, 2016, 9 pages.

Huawei et al., "Unified single/multiple beam operations for initial access," 3GPP TSG RAN WG1 #87, R1-1611667, Reno, USA, Nov. 14-18, 2016, 10 pages.

Huawei et al., "NR Primary and Secondary Synchronization Signals Design," 3GPP TSG RAN WG1 #87, R1-1611261, Reno, USA, Nov. 14-18, 2016, 10 pages.

MCC, "Rach in Gradual UE-Specific (GUS) initial access," 3GPP TSG RAN WG1 #86bis, R1-1609309, Lisbon, Portugal, Oct. 10-14, 2016, 7 pages.

* cited by examiner

US 10,756,802 B2

COMMUNICATION METHOD AND TERMINAL DEVICE

CROSS-REFERENCE TO RELATED APPLICATIONS

This application is a continuation of International Application No. PCT/CN2017/090356, filed on Jun. 27, 2017, which claims priority to Chinese Patent Application No. 201710222042.3, filed on Apr. 6, 2017, which claims priority to Chinese Patent Application No. 201611013807.4, filed on Nov. 17, 2016. The disclosures of the aforementioned applications are hereby incorporated by reference in their entireties.

TECHNICAL FIELD

The present application relates to the field of wireless technologies, and in particular, to a communication method and a terminal device.

BACKGROUND

In a high-frequency communications system, beam alignment needs to be performed between a base station and a terminal device, and the base station needs to traverse beams in all directions to ensure omnidirectional coverage of the high-frequency communications system. In a beam alignment process, the base station sends beam identifiers (beam IDs for short) of beams to the terminal device using the beams. After selecting some beams of the base station through measurement, the terminal device feeds back beam IDs of the selected beams to the base station, so that the base station and the terminal device can interact with each other over the beams selected by the terminal device. A relatively large quantity of beams exists within a coverage area of the base station, and the base station needs to number a huge quantity of beams. Therefore, a relatively large quantity of resources needs to be occupied for sending beam IDs.

SUMMARY

The present application provides a communication method and a terminal device, to resolve a problem that beam identifiers occupy a relatively large quantity of resources.

A first aspect provides a communication method. The method is as follows. A network side device generates at least one radio frame, where the radio frame includes at least one orthogonal frequency division multiplexing (OFDM) symbol, a first OFDM symbol in the at least one OFDM symbol includes a synchronization signal and a physical broadcast channel (PBCH) field, and the PBCH field includes information for indicating a beam.

Optionally, the information for indicating the beam is index information of the first OFDM symbol, and the index information of the first OFDM symbol includes a symbol identifier of the first OFDM symbol or a number of the first OFDM symbol.

Alternatively, the information for indicating the beam includes index information of the beam, and the index information of the beam is a beam identifier or a beam number. The index information of the beam may alternatively be construed as a synchronization signal block time index (SS block time index) or a synchronization signal block index (SS block index).

Alternatively, the information for indicating the beam is a synchronization signal block time index (SS block time index) or a synchronization signal block index (SS block index). The SS block time index may be used to indicate a position of an SS block in an SS block burst set, or the SS block time index may be used to indicate a position of an SS block in an SS block burst.

The synchronization signal may include a primary synchronization signal and a secondary synchronization signal.

Then, the network side device sends the radio frame to a terminal device over the beam, so that the terminal device obtains, by detecting the PBCH field in the radio frame, the information for indicating the beam, and then identifies the beam based on the obtained information for indicating the beam.

Compared with an existing mechanism, in the present application, the information for indicating the beam is carried in the PBCH field, and therefore an additional subcarrier does not need to be occupied without extending the synchronization signal. The solution reduces downlink system overheads.

A second aspect provides a communication method. After a network side device sends a generated radio frame to a terminal device, the terminal device receives the radio frame from the network side device, where the radio frame includes at least one orthogonal frequency division multiplexing (OFDM) symbol, a first OFDM symbol in the at least one OFDM symbol includes a synchronization signal and a physical broadcast channel (PBCH) field, and the PBCH field includes information for indicating a beam.

The information for indicating the beam may be a synchronization signal block time index (SS block time index) or a synchronization signal block index (SS block index). The SS block time index may be used to indicate a position of an SS block in an SS block burst set.

After detecting the information for indicating the beam, the terminal device obtains a beam identifier based on the information for indicating the beam, and then sends the beam identifier to the network side device, so that the network side device subsequently interacts with the terminal device over the beam corresponding to the beam identifier.

If the information for indicating the beam is index information of the first OFDM symbol, the terminal device may obtain the beam identifier based on the index information that is of the first OFDM symbol and that is detected from the radio frame and a number of an antenna port for receiving the first OFDM symbol.

If the information for indicating the beam is index information of the beam, the terminal device may directly obtain the beam identifier using the index information of the beam.

If the information for indicating the beam is index information of the first OFDM symbol, the terminal device may obtain the beam identifier based on the index information of the first OFDM symbol and a number of an antenna port for receiving the first OFDM symbol, a frame number of the radio frame, and a subframe number of a subframe in which the first OFDM symbol is located.

Compared with an existing mechanism, in the present application, when identifying the beam, the terminal device can directly demodulate the received PBCH field only by pertinently monitoring a physical broadcast channel, so that complexity of demodulation by the terminal device is reduced, blind detection can also be reduced to some extent, and receiving information about the physical broadcast channel can also improve transmission reliability. In addition, the PBCH field occupies a relatively small quantity of resources, so that downlink system overheads can be reduced.

A third aspect provides a communication method. A network side device generates at least one radio frame, where the radio frame includes at least one multiplexing block, the multiplexing block includes a physical broadcast channel (PBCH) field and a synchronization signal, the PBCH field includes information for indicating a beam, and the synchronization signal includes a primary synchronization signal and a secondary synchronization signal. The information for indicating the beam may include at least one of index information of a first OFDM symbol, index information of the multiplexing block, or index information of the beam.

Then, the network side device sends the generated radio frame to a terminal device over the beam, where each multiplexing block in the radio frame is carried on a same beam while being sent to the terminal device.

Compared with an existing mechanism, in the present application, the information for indicating the beam is carried in the PBCH field of a broadcast signal, and therefore occupies less resource space, so that resource space occupied by the information for indicating the beam is reduced. In addition, the information for indicating the beam is transmitted using the PBCH field, so that the terminal device can directly demodulate the received PBCH field, thereby reducing complexity of demodulation by the terminal device.

Optionally, it may be further set that the broadcast signal and the synchronization signal are subject to frequency-division multiplexing or time-division multiplexing, and that the primary synchronization signal and the secondary synchronization signal are subject to frequency-division multiplexing or time-division multiplexing. A specific radio frame structure is not limited in the present application.

A fourth aspect provides a communication method. In a downlink beam sweeping process of a network side device, after the network side device sends one or more generated radio frames to a terminal device, the terminal device receives the radio frames from the network side device, where the radio frames each include at least one multiplexing block, the multiplexing block includes a synchronization signal and a physical broadcast channel (PBCH) field, and the PBCH field includes information for indicating a beam.

After detecting the information for indicating the beam, the terminal device obtains a beam identifier based on the information for indicating the beam, and then sends the beam identifier to the network side device, so that the network side device subsequently interacts with the terminal device over the beam corresponding to the beam identifier.

If the information for indicating the beam is index information of a first OFDM symbol, the terminal device may obtain the beam identifier based on the index information that is of the first OFDM symbol and that is detected from one of the radio frames and a number of an antenna port for receiving the first OFDM symbol.

If the information for indicating the beam is index information of the beam, the terminal device may directly obtain the beam identifier using the index information of the beam.

If the information for indicating the beam is index information of a first OFDM symbol, the terminal device may obtain the beam identifier based on the index information of the first OFDM symbol and a number of an antenna port for receiving the first OFDM symbol, a frame number of one of the radio frames, and a subframe number of a subframe in which the first OFDM symbol is located.

If the information for indicating the beam is index information of a first OFDM symbol, the terminal device may obtain the beam identifier based on index information of the multiplexing block and a number of an antenna port for receiving the first OFDM symbol, a frame number of one of the radio frames, and a subframe number of a subframe in which the first OFDM symbol is located.

Compared with an existing mechanism, in the present application, when identifying the beam, the terminal device can directly demodulate the received PBCH field only by pertinently monitoring a physical broadcast channel, so that complexity of demodulation by the terminal device is reduced, blind detection can also be reduced to some extent, and receiving information about the physical broadcast channel can also improve transmission reliability. In addition, the PBCH field occupies a relatively small quantity of resources, so that resource overheads can be reduced.

A fifth aspect of the present application provides a network side device, having functions of implementing the communication method provided in the first aspect. The functions may be implemented by hardware, or may be implemented by hardware executing corresponding software. The hardware or the software includes one or more modules corresponding to the foregoing functions. The modules may be software and/or hardware.

In a possible design, the network side device includes: a processing module, configured to generate at least one radio frame, where the radio frame includes at least one orthogonal frequency division multiplexing (OFDM) symbol, a first OFDM symbol in the at least one OFDM symbol includes a synchronization signal and a physical broadcast channel (PBCH) field, and the PBCH field includes information for indicating a beam; and a transceiver module, configured to send the radio frame generated by the processing module to a terminal device.

In another possible design, the information for indicating the beam is index information of the first OFDM symbol, a synchronization signal block time index (SS block time index), or a synchronization signal block index (SS block index), and the index information of the first OFDM symbol includes a symbol identifier of the first OFDM symbol or a number of the first OFDM symbol. The SS block time index may be used to indicate a position of an SS block in an SS block burst set, or the SS block time index may be used to indicate a position of an SS block in an SS block burst.

In another possible design, the information for indicating the beam is index information of the beam, a synchronization signal block time index (SS block time index), or a synchronization signal block index (SS block index), and the index information of the beam is a beam identifier or a beam number. The SS block time index may be used to indicate a position of an SS block in an SS block burst set, or the SS block time index may be used to indicate a position of an SS block in an SS block burst.

In another possible design, the synchronization signal includes a primary synchronization signal and a secondary synchronization signal.

In a possible design, the network side device includes: at least one processor, memory, and transceiver. The memory is configured to store program code, and the processor is configured to invoke the program code in the memory to perform the following operations: generating at least one radio frame, where each radio frame includes at least one orthogonal frequency division multiplexing (OFDM) symbol, a first OFDM symbol in the at least one OFDM symbol includes a physical broadcast channel (PBCH) field, and the PBCH field includes information for indicating a beam; and sending the generated radio frame to a terminal device by using the transceiver.

A sixth aspect of the present application provides a terminal device, having functions of implementing the communication method provided in the second aspect. The functions may be implemented by hardware, or may be implemented by hardware executing corresponding software. The hardware or the software includes one or more modules corresponding to the foregoing functions. The modules may be software and/or hardware.

In a possible design, the terminal device includes a transceiver module, configured to receive at least one radio frame from a network side device, where each radio frame includes at least one orthogonal frequency division multiplexing (OFDM) symbol, a first OFDM symbol in the at least one OFDM symbol includes a synchronization signal and a physical broadcast channel (PBCH) field, and the PBCH field includes information for indicating a beam. The terminal device also includes a processing module, configured to obtain a beam identifier based on the information for indicating the beam that is obtained by the transceiver module. The transceiver module is further configured to send the beam identifier obtained by the processing module to the network side device.

In another possible design, the information for indicating the beam includes index information of the first OFDM symbol, and the index information of the first OFDM symbol includes a symbol identifier of the first OFDM symbol or a number of the first OFDM symbol.

In another possible design, the information for indicating the beam is index information of the beam, a synchronization signal block time index (SS block time index), or a synchronization signal block index (SS block index), and the index information of the beam is a beam identifier or a beam number. The SS block time index may be used to indicate a position of an SS block in an SS block burst set, or the SS block time index may be used to indicate a position of an SS block in an SS block burst.

In another possible design, the synchronization signal includes a primary synchronization signal and a secondary synchronization signal.

In a possible design, the terminal device includes: at least one processor, memory, and transceiver. The memory is configured to store program code. The processor is configured to invoke the program code in the memory to perform the following operations: receiving a radio frame from a network side device by using the transceiver, where the radio frame includes at least one orthogonal frequency division multiplexing (OFDM) symbol, a first OFDM symbol in the at least one OFDM symbol includes a synchronization signal and a physical broadcast channel (PBCH) field, and the PBCH field includes information for indicating a beam; obtaining a beam identifier based on the information for indicating the beam that is obtained by the transceiver module; and sending the beam identifier to the network side device by using the transceiver.

A seventh aspect of the present application provides a network side device, having functions of implementing the method performed by the network side device provided in the third aspect. The functions may be implemented by hardware, or may be implemented by hardware executing corresponding software. The hardware or the software includes one or more modules corresponding to the foregoing functions. The modules may be software and/or hardware.

In a possible design, the network side device includes: a processing module, configured to generate at least one radio frame, where each radio frame includes at least one multiplexing block, the multiplexing block includes a synchronization signal and a physical broadcast channel (PBCH) field, and the PBCH field includes information for indicating a beam. The network side device also includes a transceiver module, configured to send the radio frame generated by the processing module to a terminal device.

In another possible design, a same multiplexing block is carried on a same beam for being sent to the terminal device.

In another possible design, the information for indicating the beam includes at least one of index information of a first OFDM symbol, index information of the multiplexing block, or index information of the beam.

In another possible design, the PBCH field and the synchronization signal are subject to frequency-division multiplexing or time-division multiplexing.

In another possible design, the synchronization signal includes a primary synchronization signal and a secondary synchronization signal, and the primary synchronization signal and the secondary synchronization signal are subject to frequency-division multiplexing or time-division multiplexing.

In a possible design, the network side device includes: at least one processor, memory, and transceiver. The memory is configured to store program code. The processor is configured to invoke the program code in the memory to perform the following operations: generating a radio frame, where the radio frame includes at least one multiplexing block, the multiplexing block includes a synchronization signal and a physical broadcast channel (PBCH) field, and the PBCH field includes information for indicating a beam; and sending the generated radio frame to a terminal device by using the transceiver.

An eighth aspect of the present application provides a terminal device, having functions of implementing the communication method provided in the fourth aspect. The functions may be implemented by hardware, or may be implemented by hardware executing corresponding software. The hardware or the software includes one or more modules corresponding to the foregoing functions. The modules may be software and/or hardware.

In a possible design, the terminal device includes a transceiver module, configured to receive at least one radio frame from a network side device, where each radio frame includes at least one multiplexing block, the multiplexing block includes a synchronization signal and a physical broadcast channel (PBCH) field, and the PBCH field includes information for indicating a beam. The terminal device also includes a processing module, configured to obtain a beam identifier based on the information for indicating the beam that is obtained by the transceiver module, where the transceiver module is further configured to send the beam identifier obtained by the processing module to the network side device.

In another possible design, a same multiplexing block is carried on a same beam for being sent to the terminal device.

In another possible design, the information for indicating the beam is at least one of index information of a first OFDM symbol, index information of the multiplexing block, index information of the beam, a synchronization signal block time index (SS block time index), or a synchronization signal block index (SS block index). The SS block time index may be used to indicate a position of an SS block in an SS block burst set, or the SS block time index may be used to indicate a position of an SS block in an SS block burst.

In another possible design, the PBCH field and the synchronization signal are subject to frequency-division multiplexing or time-division multiplexing.

In another possible design, the synchronization signal includes a primary synchronization signal and a secondary synchronization signal, and the primary synchronization signal and the secondary synchronization signal are subject to frequency-division multiplexing or time-division multiplexing.

In a possible design, the terminal device includes: at least one processor, memory, and transceiver. The memory is configured to store program code, and the processor is configured to invoke the program code in the memory to perform the following operations: receiving at least one radio frame from a network side device by using the transceiver, where each radio frame includes at least one multiplexing block, the multiplexing block includes a synchronization signal and a physical broadcast channel (PBCH) field, and the PBCH field includes information for indicating a beam; obtaining a beam identifier based on the information for indicating the beam that is obtained by the transceiver module; and sending the obtained beam identifier to the network side device by using the transceiver.

Compared with a current technology, in the solutions provided in the present application, the information for indicating the beam is carried in the PBCH field of the first OFDM symbol or the PBCH field of the multiplexing block. In the two manners, a relatively small quantity of subcarriers are occupied, so that downlink system overheads can be reduced.

DETAILED DESCRIPTION OF ILLUSTRATIVE EMBODIMENTS

Figure 1:
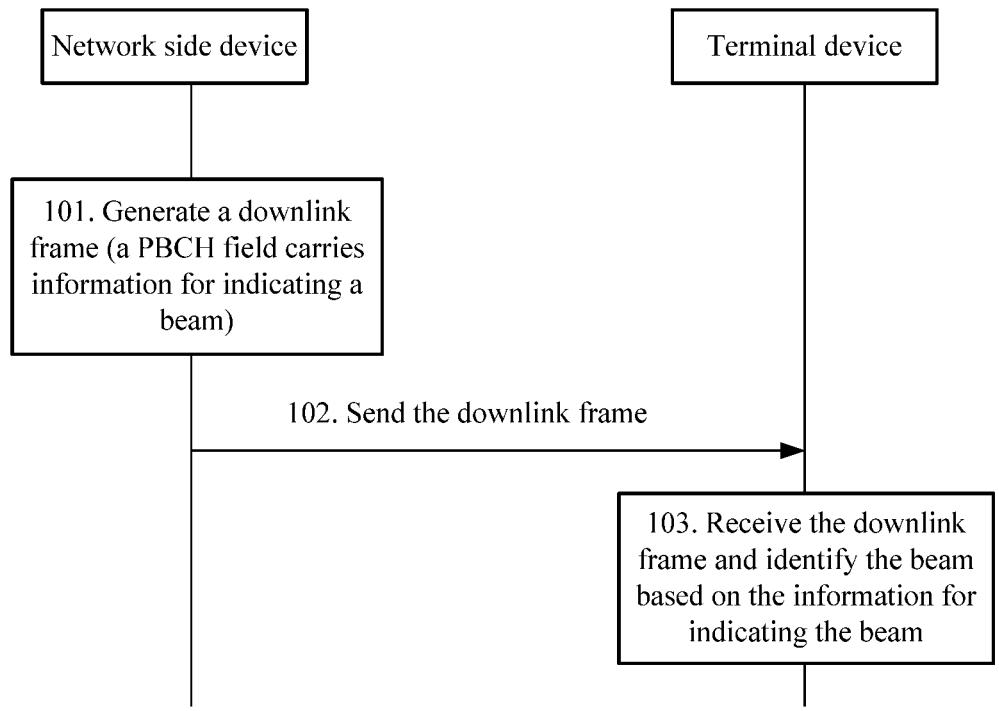
FIG. 1 is a schematic diagram of an embodiment of a communication method according to an embodiment.

In the specification, claims, and accompanying drawings of the present application, the terms "first", "second", and the like are intended to distinguish between similar objects but do not necessarily indicate a specific order or sequence. It should be understood that the data termed in such a way is interchangeable in proper circumstances so that the embodiments of the present application described herein can be implemented in other orders than the order illustrated or described herein. In addition, the terms "include", "have", or any other variants thereof are intended to cover a non-exclusive inclusion. For example, a process, a method, a system, a product, or a device that includes a series of steps or modules is not necessarily limited to the steps or modules that are expressly listed, but may include another step or module that is not expressly listed or inherent to the process, the method, the system, the product, or the device. The module division in this specification is merely logical division, and there may be other division during implementation in actual application. For example, a plurality of modules may be combined or integrated into another system, or some features may be ignored or not performed. In addition, the displayed or discussed mutual couplings or direct couplings or communication connections may be implemented by using some interfaces. The indirect couplings or communication connections between the modules may be implemented in electronic or another similar form. This is not limited in this specification. In addition, modules or sub-modules described as separate components may be or may not be physically separated, or may be or may not be physical modules, or may be distributed to a plurality of circuit modules. Some or all of the modules may be selected based on an actual requirement to achieve the objectives of the solutions of the embodiments of the present application.

Embodiments of the present application provide a communication method and a terminal device that are applied to a licensed spectrum or an unlicensed spectrum. Details are described below.

A network side device in the embodiments of the present application is a device that enables a terminal device to access a wireless network, and is also referred to as a base station, including but not limited to: an evolved NodeB (eNB for short), a radio network controller (RNC for short), a NodeB (NB for short), a base station controller (BSC for short), a base transceiver station (BTS for short), a home base station (for example, a home evolved NodeB or a home NodeB, HNB for short), or a baseband unit (BBU for short).

The terminal device in the embodiments of the present application may be a device that provides a user with voice and/or data connectivity, a handheld device with a wireless connection function, or another processing device connected to a wireless modem. The terminal device may communicate with one or more core networks using a radio access network (RAN for short). The terminal device may be a mobile terminal, such as a mobile phone (also referred to as a "cellular" phone) or a computer with a mobile terminal, for example, may be a portable, pocket-sized, handheld, computer built-in, or in-vehicle mobile apparatus that exchanges voice and/or data with the radio access network. For example, the terminal device may be a device such as a personal communications service (PCS for short) phone, a cordless telephone set, a Session Initiation Protocol (SIP) phone, a wireless local loop (WLL for short) station, or a personal digital assistant (PDA for short). A terminal device may also be referred to as a system, a subscriber unit (Subscriber Unit), a subscriber station, a mobile station, a mobile, a remote station, an access point, a remote terminal, an access terminal, a user terminal, a terminal device, a user agent, a user device, or user equipment.

The network side device periodically sends a synchronization signal and a broadcast signal to the terminal device within a coverage area of the network side device, so that the terminal device synchronizes with the network side device based on the received synchronization signal, and prepares to receive broadcast channel information. The synchronization signal includes a primary synchronization signal (PSS for short) and a secondary synchronization signal (SSS). In a process of accessing the network side device, the terminal device needs to search for the PSS and the SSS. The PSS is generated using an autocorrelation attribute (ZC for short) sequence, and is used to distinguish between sectors. The SSS is generated using a pseudo-random sequence, and is used to distinguish between base stations.

Alternatively, the terminal device may be a remote terminal device outside the coverage area of the network side device. The remote terminal device may access the network side device via a relay device. Details are not described in the present application.

To resolve the foregoing technical problems, the embodiments of the present application mainly provide the following technical solutions.

Solution 1: Information for indicating a beam is carried in some orthogonal frequency division multiplexing (OFDM for short) symbols in a radio frame. The some OFDM symbols each include a synchronization signal and a physical broadcast channel (PBCH for short) field. Then, the radio frame is sent to a terminal device. Without extending the OFDM symbol, the information for indicating the beam is sent using the PBCH field, and therefore an additional carrier does not need to be occupied. The solution 1 reduces downlink system overheads, that is, reduces, to some extent, occupied resource space for carrying the information for indicating the beam.

It should be noted that, the radio frame may include at least two subframes, where each subframe includes a plurality of OFDM symbols; or the radio frame may directly include a plurality of OFDM symbols. A specific frame format is not limited in the embodiments of the present application. For any unclear part about the frame format, refer to an existing LTE time division multiplexing (TDD for short) frame.

Solution 2: A broadcast signal and a synchronization signal are combined into a multiplexing block, and information for indicating a beam is carried in a PBCH field of the broadcast signal and then sent to a terminal device. The PBCH field and the synchronization signal may be subject to frequency-division multiplexing or time-division multiplexing. A same multiplexing block is sent to the terminal device over a same beam or at least two beams. Because a modulation and coding scheme of the broadcast signal is different from a modulation and coding scheme of the synchronization signal, compared with the modulation and coding scheme of the synchronization signal, the PBCH field of the broadcast signal is used to carry the information for indicating the beam, so that resource space occupied by the information for indicating the beam can be reduced. It can be learned that, in such a manner of sending the multiplexing block, resources can also be saved, and complexity of demodulation by the terminal device can also be reduced. In addition, the multiplexing block may also be referred to as a combined signal or resource block. A specific name is not limited in the present application.

According to the foregoing two solutions, resources required for carrying the information for indicating the beam can be reduced, and reliability of the information can also be improved to some extent due to a transmission characteristic of the PBCH field.

Referring to FIG. 1, the following uses an example to describe a communication method provided in the present application. A network side device traverses beams in all directions to ensure coverage within a specific area (including omnidirectional coverage or directional coverage). The network side device needs to design beam IDs for the beams in these directions, and send the beam IDs to a terminal device, so that the terminal device identifies the beam IDs of the beams through beam sweeping, by monitoring a physical broadcast channel, or in another manner. This embodiment of the present application includes the following steps.

101. A network side device generates at least one radio frame.

Each radio frame includes at least one OFDM symbol, and the radio frame includes at least some OFDM symbols each including a synchronization signal and a PBCH field.

The network side device sends information for indicating a beam to a terminal device mainly in the following manners.

In Manner 1, the information for indicating the beam is placed in a PBCH field of an OFDM symbol including a synchronization signal.

Figure 2:
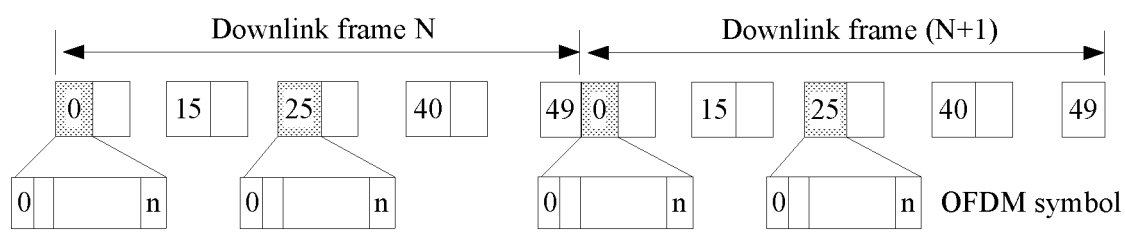
FIG. 2 is a schematic structural diagram of a radio frame according to an embodiment.

For example, as shown in FIG. 2, first OFDM symbols are any OFDM symbol in a subframe with a subframe number 0 and an OFDM symbol in a subframe with a subframe number 25, and the information for indicating the beam may be separately set in a PBCH field of the first OFDM symbol in the subframe with the subframe number 0 and a PBCH field of the first OFDM symbol in the subframe with the subframe number 25.

In Manner 2, a broadcast signal and a synchronization signal are combined into a multiplexing block, where the multiplexing block may include at least one OFDM symbol; and the information for indicating the beam is carried in a PBCH field of the broadcast signal.

Correspondingly, in Manner 2, each radio frame includes at least one multiplexing block, the multiplexing block includes a broadcast signal and a synchronization signal, and a PBCH field of the broadcast signal includes the information for indicating the beam. When a plurality of multiplexing blocks are included, the plurality of multiplexing blocks include at least two multiplexing blocks that are contiguous in time domain. The information for indicating the beam includes at least one of index information of a first OFDM symbol, index information of the multiplexing block, or index information of the beam. Each multiplexing block may be sent over a same beam or at least two beams, that is, each OFDM symbol in each multiplexing block is sent over the same beam or the at least two beams. In addition, at least two of the plurality of multiplex blocks are sent over different beams. To be specific, the at least two multiplexing blocks carry different beam numbers, the at least two multiplexing blocks carry different reference signal sequences that are used to indicate beam numbers, or the at least two multiplexing blocks carry different reference signal resource numbers used to indicate beam numbers.

Figure 3:
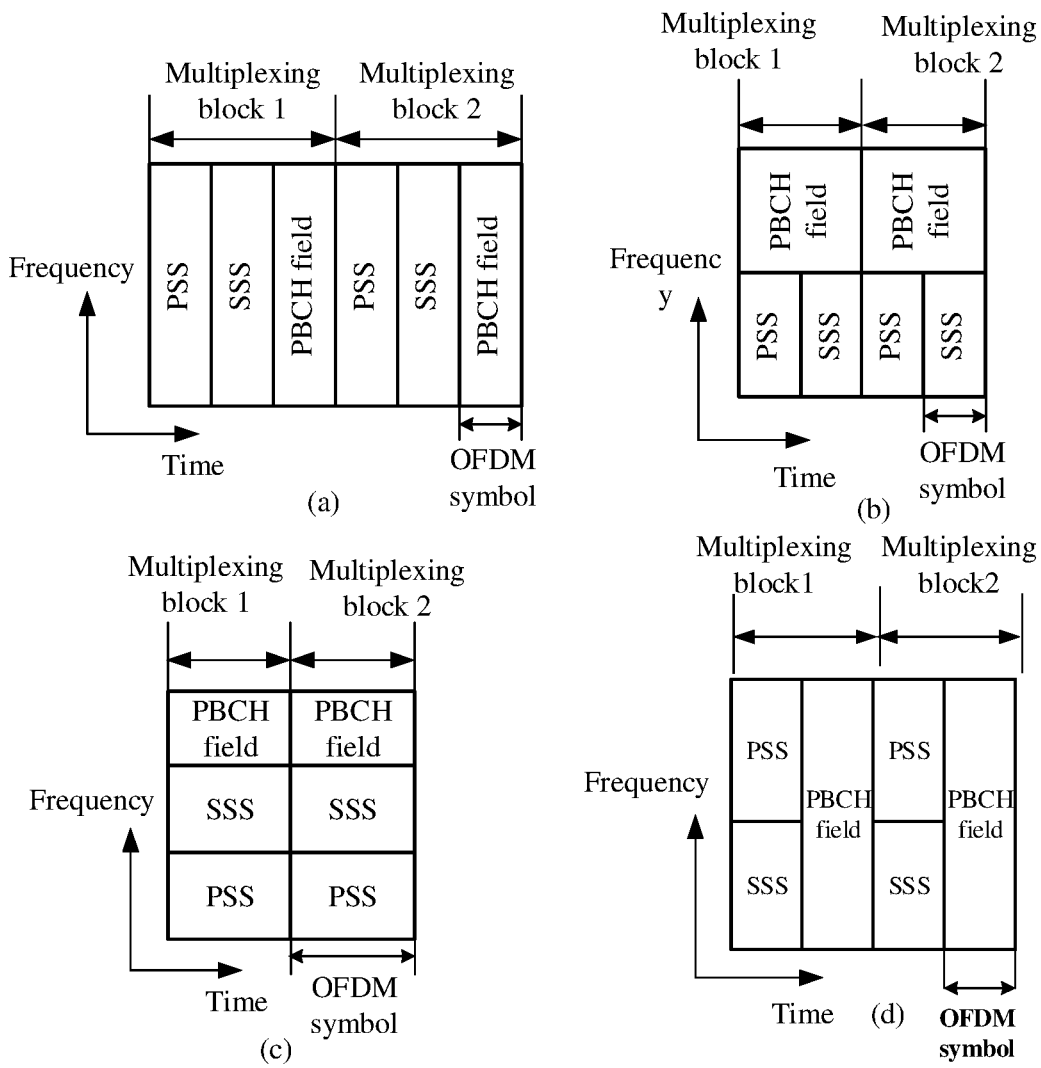
FIG. 3 is another schematic structural diagram of a radio frame according to an embodiment.

In an actual application scenario, the broadcast signal and the synchronization signal may be subject to frequency-division multiplexing or time-division multiplexing, the synchronization signal includes a PSS and an SSS, and optionally, each multiplexing block includes one PSS and one SSS. (a) and (d) in FIG. 3 show radio frame structures in which a broadcast signal and a synchronization signal are subject to time-division multiplexing, a multiplexing block 1 and a multiplexing block 2 each include a PSS, an SSS, and a PBCH field, and the PBCH field and the PSS and the SSS in the multiplexing block 1 are subject to time-division multiplexing. (b) and (c) in FIG. 3 show radio frame structures in which a broadcast signal and a synchronization signal are subject to frequency-division multiplexing, a multiplexing block 1 and a multiplexing block 2 each include a PSS, an SSS, and a PBCH field, and the PBCH field and the PSS and the SSS in the multiplexing block 1 are subject to frequency-division multiplexing.

In addition, because the synchronization signal includes the primary synchronization signal and the secondary synchronization signal, in Manner 2, the primary synchronization signal and the secondary synchronization signal may be subject to frequency-division multiplexing or time-division multiplexing. For example, (a), (b), and (d) in FIG. 3 show radio frame structures in which the PSS and the SSS are subject to time-division multiplexing, and (c) in FIG. 3 shows a radio frame structure in which the PSS and the SSS are subject to frequency-division multiplexing. Manner 1 and Manner 2 may be combined for use, or Manner 1 may be used as a specific embodiment of Manner 2. A specific combination manner is not limited in the present application.

Because the terminal device may obtain the information for indicating the beam based on a frame number of the radio frame, a subframe number of a subframe in which the first OFDM symbol is located, a number of an antenna port for receiving the first OFDM symbol, and index information of the first OFDM symbol, for the information for indicating the beam added by the network side device to the PBCH field, there are mainly the following several cases.

a. The index information of the first OFDM symbol is carried in the PBCH field, where the index information of the first OFDM symbol includes a symbol identifier of the first OFDM symbol or a number of the first OFDM symbol.

b. The index information of the beam is carried in the PBCH field, where the index information of the beam is a beam identifier or a beam number. The index information of the beam may be construed as a synchronization signal block time index (SS block time index) or a synchronization signal block index (SS block index).

c. The index information of the multiplexing block is carried in the PBCH field, where the index information of the multiplexing block is a block identifier of the multiplexing block or a number of the multiplexing block.

d. A synchronization signal block time index (SS block time index) or a synchronization signal block index (SS block index) is carried in the PBCH field. The SS block time index may be used to indicate a position of an SS block in an SS block burst set, or the SS block time index may be used to indicate a position of an SS block in an SS block burst.

The foregoing a, b, and d are applicable to Manner 1 and Manner 2, and c is applicable only to Manner 2. In Manner 1, the PBCH field may carry at least one of a, b, or d. In Manner 2, the PBCH field may carry at least one of a, b, c, or d.

For example, as shown in FIG. 2, a subframe 0 and a subframe 25 of each radio frame are used to perform downlink synchronization scanning. Each OFDM symbol in each subframe carries a synchronization signal and a PBCH field, and an ID of the OFDM symbol is carried in the PBCH field. m beams may be emitted for a same OFDM symbol, each subframe includes (n+1) OFDM symbols, and two radio frames, that is, four subframes, in total, are needed to traverse downlink beams in all directions. Therefore, a total quantity of beams is 4*m*(n+1), and OFDM symbol IDs carried in the OFDM symbols of each subframe are 0, 1, . . . , and n. If the terminal device synchronizes with a beam, the terminal device may obtain a beam number based on an OFDM symbol ID, an antenna port number of the beam, a frame number of a radio frame, and a subframe number of a subframe in which an OFDM symbol is located, and then reports the obtained beam number to the network side device, where the OFDM symbol ID, the antenna port number, the frame number of the radio frame, and the subframe number of the subframe are obtained by the terminal device through parsing.

If the frame number of the radio frame for synchronization is an even number and the subframe number is 0, the beam number is $i*m+p$. If the frame number of the radio frame for synchronization is an even number and the subframe number is 25, the beam number is $(n+i+1)*m+p$. If the frame number of the radio frame for synchronization is an odd number and the subframe number is 0, the beam number is $(2n+i+2)*m+p$. If the frame number of the radio frame for synchronization is an odd number and the subframe number is 25, the beam number is $(3n+i+3)*m+p$.

102. The network side device sends the at least one radio frame to a terminal device.

103. The terminal device receives the at least one radio frame sent by an access network, and identifies a beam based on information for indicating the beam in the radio frame.

Because a plurality of beams may be emitted for a same OFDM symbol, and different beams are separately emitted through different antenna ports, the plurality of beams emitted for the same OFDM symbol may share index information of the OFDM symbol. Because the OFDM symbol has unique index information, when identifying a beam, the terminal device may distinguish between the beams from the same OFDM symbol using antenna port numbers. That the terminal device identifies a beam based on a quantity of radio frames required by a synchronization signal mainly includes the following several cases.

1. Beams in all directions can be traversed only by placing the synchronization signal in one radio frame.

The terminal device obtains the index information of the first OFDM symbol or the index information of the multiplexing block by detecting a PBCH, obtains an antenna port number of a receiving beam using the receiving beam, and obtains the number of the subframe in which the first OFDM symbol is located. Then, the terminal device obtains the index information of the beam based on the index information of the first OFDM symbol (or the index information of the multiplexing block), the antenna port number, and the number of the subframe in which the first OFDM symbol is located, thereby identifying the receiving beam.

2. Beams in all directions can be traversed only by placing the synchronization signal in at least two radio frames.

The terminal device needs to obtain the index information of the first OFDM symbol or the index information of the multiplexing block, and an antenna port number of a receiving beam, and obtain the number of the subframe in which the first OFDM symbol is located and the frame number of the radio frame in which the first OFDM symbol is located. Then, the terminal device can obtain the index information of the beam based on the index information of the first OFDM symbol (or the index information of the multiplexing block), the antenna port number, the number of the subframe in which the first OFDM symbol is located, and the frame number of the radio frame in which the first OFDM symbol is located, thereby identifying the receiving beam.

In this embodiment of the present application, the information for indicating the beam is carried in the PBCH field, and therefore an additional subcarrier does not need to be occupied without extending the synchronization signal, in other words, downlink system overheads can be reduced. In addition, the information for indicating the beam is carried in the PBCH field of the broadcast signal. Because the information encoded and modulated into the broadcast signal occupies less resource space compared with an existing mechanism, the downlink system overheads can be further reduced. It can be learned that, compared with the existing mechanism, in the two manners, a smaller quantity of subcarriers are occupied, and therefore the downlink system overheads can be reduced.

In addition, because the PBCH field is used to transmit the information for indicating the beam, the terminal device can directly demodulate the received PBCH field after receiving the radio frame, so that complexity of demodulation by the terminal device is reduced, blind detection can also be reduced to some extent, and receiving information about the physical broadcast channel can also improve transmission reliability. In addition, the PBCH field occupies a relatively small quantity of resources, so that resource overheads are further reduced.

The foregoing describes the communication method in the present application, and the following separately describes the network side device and the terminal device that perform the foregoing communication method.

Figure 4:
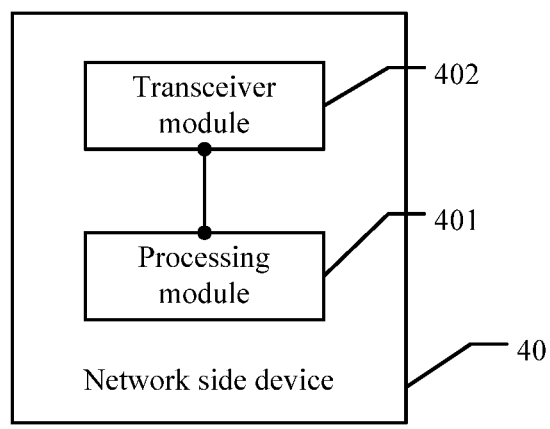
FIG. 4 is a schematic structural diagram of a network side device according to an embodiment.

1. Referring to FIG. 4, a network side device 40 is described. The network side device includes a processing module 401, configured to generate a radio frame, where the radio frame includes at least one orthogonal frequency division multiplexing (OFDM) symbol, a first OFDM symbol in the at least one OFDM symbol includes a synchronization signal and a PBCH field, and the PBCH field includes information for indicating a beam; or the radio frame includes at least one multiplexing block, the multiplexing block includes a synchronization signal and a PBCH field, and the PBCH field includes information for indicating a beam. The network side device 40 also includes a transceiver module 402, configured to send the radio frame generated by the processing module 401 to a terminal device, so that the terminal device can identify the beam based on the obtained information for indicating the beam and communicate with the network side device over the identified beam.

Optionally, the information for indicating the beam is index information of the first OFDM symbol, a synchronization signal block time index (SS block time index), or a synchronization signal block index (SS block index), and the index information of the first OFDM symbol includes a symbol identifier of the first OFDM symbol or a number of the first OFDM symbol. Alternatively, the information for indicating the beam includes index information of the beam, and the index information of the beam is a beam identifier or a beam number. The SS block time index may be used to indicate a position of an SS block in an SS block burst set, or the SS block time index may be used to indicate a position of an SS block in an SS block burst.

Optionally, the information for indicating the beam includes at least one of index information of the first OFDM symbol, index information of the multiplexing block, or index information of the beam.

In this embodiment of the present application, the processing module 401 generates the radio frame including the first OFDM symbol having the PBCH field, and adds the information for indicating the beam to the PBCH field; or generates the radio frame including the multiplexing block, and adds the information for indicating the beam to the PBCH field of the multiplexing block. In both the two manners of carrying the information for indicating the beam, resources occupied by the information for indicating the beam can be reduced, and stability in transmitting the information for indicating the beam can also be improved.

Figure 5:
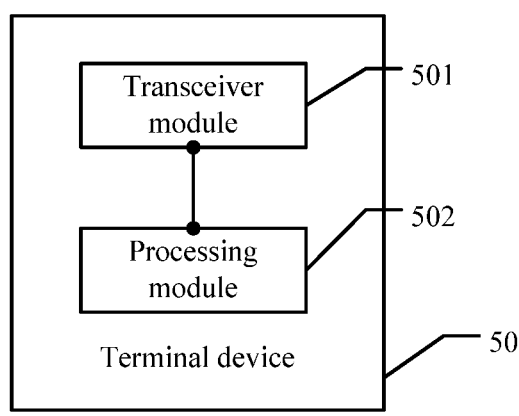
FIG. 5 is a schematic structural diagram of a terminal device according to an embodiment.

2. Referring to FIG. 5, a terminal device 50 is described. The terminal device 50 includes a transceiver module 501 and a processing module 502. In a process in which the terminal device 50 performs beam synchronization, the transceiver module 501 receives a radio frame from a network side device.

The processing module 502 obtains a beam identifier based on the information for indicating the beam that is obtained by the transceiver module 501. Then, the transceiver module 501 sends the beam identifier obtained by the processing module 502 to the network side device.

The radio frame may include at least one orthogonal frequency division multiplexing OFDM symbol, a first OFDM symbol in the at least one OFDM symbol includes a synchronization signal and a physical broadcast channel (PBCH) field, and the PBCH field includes the information for indicating the beam. Alternatively, the radio frame includes at least one multiplexing block, the multiplexing block includes a synchronization signal and a physical broadcast channel PBCH field, and the PBCH field includes the information for indicating the beam.

If the information for indicating the beam is index information of the first OFDM symbol, the processing module 502 is specifically configured to: obtain the beam identifier based on the index information of the first OFDM symbol and a number of an antenna port for receiving the first OFDM symbol.

If the information for indicating the beam is index information of the beam, the processing module 502 is specifically configured to: obtain the beam identifier based on the index information of the beam.

If the information for indicating the beam is index information of the first OFDM symbol, the processing module 502 is specifically configured to: obtain the beam identifier based on the index information of the first OFDM symbol, a number of an antenna port for receiving the first OFDM symbol, a frame number of the radio frame, and a subframe number of a subframe in which the first OFDM symbol is located.

If the information for indicating the beam is an SS block time index, the processing module 502 is specifically configured to: use the SS block time index as the beam identifier; or obtain the beam identifier based on the SS block time index and a number of an antenna port for receiving the SS block; or obtain the beam identifier based on the SS block time index, a number of an antenna port for receiving the SS block, a frame number of the radio frame, and a subframe number of a subframe in which the SS block is located.

In the embodiments corresponding to FIG. 4 and FIG. 5, for specific definitions of the synchronization signal and the PBCH field included in the radio frame, the carried information, characteristics of the carried information, and the like, refer to the foregoing method embodiments. In addition, the network side device or the terminal device in the embodiments of the present application can perform content described in any one of the foregoing method embodiments (including the embodiments shown in FIG. 1 to FIG. 3). Details are not described herein again.

Figure 6:
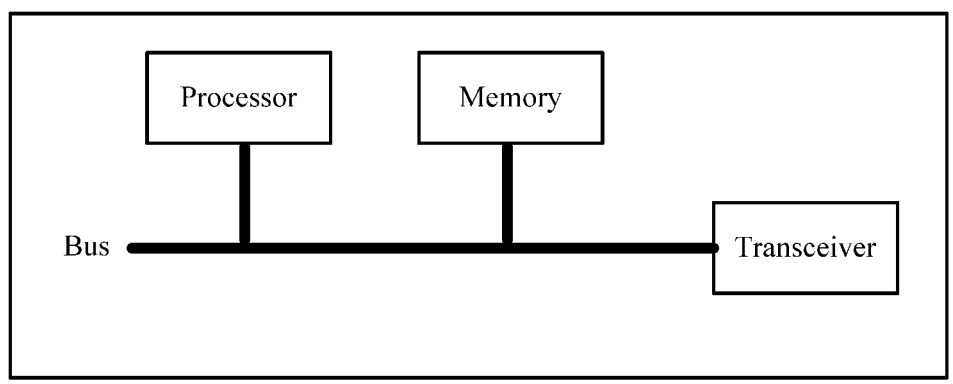
FIG. 6 is a schematic structural diagram of a physical apparatus for performing a communication method according to an embodiment.

It should be noted that in the embodiment corresponding to FIG. 4 or FIG. 5, a physical device corresponding to the transceiver module (including a receiving module and a sending module) may be a transceiver (including a receiver and a transmitter), and a physical device corresponding to the processing module may be a processor. The apparatus shown in FIG. 4 or FIG. 5 may have a structure shown in FIG. 6. When an apparatus has the structure shown in FIG. 6, a processor and a transceiver in FIG. 6 implement functions that are the same as or similar to functions of the processing module and the transceiver module that are provided in the foregoing apparatus embodiment corresponding to the apparatus. A memory in FIG. 6 stores program code that needs to be invoked by the processor when the foregoing communication method is performed.

In the foregoing embodiments, the descriptions of the embodiments have respective focuses. For a part that is not described in detail in an embodiment, refer to related descriptions in other embodiments.

It may be clearly understood by a person skilled in the art that, for the purpose of convenient and brief description, for a detailed working process of the foregoing system, apparatus, and module, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented by using some interfaces. The indirect couplings or communication connections between the apparatuses or modules may be implemented in electronic, mechanical, or other forms.

The modules described as separate parts may or may not be physically separate, and parts displayed as modules may or may not be physical modules, that is, may be located in one position, or may be distributed on a plurality of network modules. Some or all of the modules may be selected based on an actual requirement to achieve the objectives of the solutions of the embodiments.

In addition, functional modules in the embodiments of the present application may be integrated into one processing module, or each of the modules may exist alone physically, or two or more modules may be integrated into one module. The integrated module may be implemented in a form of hardware, or may be implemented in a form of a software functional module.

When the integrated module is implemented in the form of a software functional module and sold or used as an independent product, the integrated module may be stored in a computer readable storage medium. Based on such an understanding, the technical solutions of the present application essentially, or the part contributing to the prior art, or all or some of the technical solutions may be implemented in the form of a software product. The computer software product is stored in a storage medium and includes several instructions for enabling a computer device (which may be a personal computer, a server, a network device, or the like) to perform all or some of the steps of the methods described in the embodiments of the present application. The foregoing storage medium includes: any medium that can store program code, such as a USB flash drive, a removable hard disk, a read-only memory (ROM for short), a random access memory (RAM for short), a magnetic disk, or an optical disc.

The technical solutions provided in the present application are described in detail above. The principle and implementations of the present application are described herein by using specific examples in this specification. The foregoing descriptions about the embodiments are merely provided to help understand the method and core ideas of the present application. In addition, a person of ordinary skill in the art can make variations and modifications to the present application in terms of the specific implementations and application scopes according to the ideas of the present application. Therefore, the content of specification shall not be construed as a limitation to the present application.

What is claimed is:

1. A method, comprising:
generating one or more radio frames, wherein each radio frame of the one or more radio frames comprises at least one multiplexing block, each multiplexing block of the at least one multiplexing block comprises a respective synchronization signal and a respective physical broadcast channel (PBCH), and the respective PBCH of each multiplexing block of the at least one multiplexing block comprises information indicating a respective beam; and
sending the one or more radio frames to a terminal device;
wherein the information indicating the respective beam comprises: index information of a respective first orthogonal frequency division multiplexing (OFDM) symbol, index information of the respective multiplexing block, index information of the respective beam, a respective synchronization signal block time index (SS block time index), or a respective synchronization signal block index (SS block index).

2. The method according to claim 1, wherein each multiplexing block of the at least one multiplexing block is sent to the terminal device using a respective beam.

3. The method according to claim 1, wherein in each multiplexing block of the at least one multiplexing block the respective PBCH and the respective synchronization signal are frequency-division multiplexed or time-division multiplexed.

4. The method according to claim 1, wherein in each multiplexing block of the at least one multiplexing block the respective synchronization signal comprises a respective primary synchronization signal (PSS) and a respective secondary synchronization signal (SSS), and the respective PSS and the respective SSS are time-division multiplexed.

5. The method according to claim 1, wherein a first radio frame of the one or more radio frames comprises a plurality of multiplexing blocks, and at least two of the plurality of multiplexing blocks are sent using different beams.

6. The method according to claim 1, wherein each multiplexing block of the at least one multiplexing block comprises one respective primary synchronization signal and one respective secondary synchronization signal.

7. A method, comprising:
receiving one or more radio frames from a network side device, wherein each radio frame of the one or more radio frames comprises at least one multiplexing block, each multiplexing block of the at least one multiplexing block comprises a respective synchronization signal and a respective physical broadcast channel (PBCH), and the respective PBCH of each multiplexing block of the at least one multiplexing block comprises information indicating a respective beam; and
for each multiplexing block of the at least one multiplexing block, obtaining a respective beam identifier based on the information indicating the respective beam;
wherein the information indicating the respective beam comprises: index information of a respective first orthogonal frequency division multiplexing (OFDM) symbol, index information of the respective multiplexing block, index information of the respective beam, a respective synchronization signal block time index (SS block time index), or a respective synchronization signal block index (SS block index).

8. The method according to claim 7, wherein in each multiplexing block of the at least one multiplexing block the information indicating the respective beam is the index information of the respective first OFDM symbol, and for each multiplexing block of the at least one multiplexing block, obtaining the respective beam identifier based on the information indicating the respective beam comprises:
    for each multiplexing block of the at least one multiplexing block, obtaining the respective beam identifier based on the index information of the respective first OFDM symbol and a number of a respective antenna port for receiving the respective first OFDM symbol.

9. The method according to claim 7, wherein:
for each multiplexing block of the at least one multiplexing block, the information indicating the respective beam is the index information of the respective first OFDM symbol; and
for each multiplexing block of the at least one multiplexing block, obtaining the respective beam identifier based on the information indicating the respective beam comprises:
    for each multiplexing block of the at least one multiplexing block, obtaining the respective beam identifier based on the index information of the respective first OFDM symbol, a number of a respective antenna port for receiving the respective first OFDM symbol, a frame number of a respective radio frame of the one or more radio frames, and a respective subframe number of a respective subframe in which the respective first OFDM symbol is located.

10. The method according to claim 7, wherein:
in each multiplexing block of the one or more multiplexing blocks the information indicating the respective beam is the index information of the respective multiplexing block; and
for each multiplexing block of the at least one multiplexing block, obtaining the respective beam identifier based on the information indicating the respective beam comprises:
    for each multiplexing block of the at least one multiplexing block, obtaining the respective beam identifier based on the index information of the respective multiplexing block, a number of a respective antenna port for receiving the respective first OFDM symbol, a respective frame number of the respective radio frame, and a respective subframe number of a respective subframe in which the respective first OFDM symbol is located.

11. A terminal device, comprising:
one or more non-transitory memories configured to store instructions; and
one or more processors coupled to the one or more memories, wherein the one or more processors are configured to execute the instructions to cause the terminal device to:
receive one or more radio frames from a network side device, wherein each radio frame of the one or more radio frames comprises at least one multiplexing block, each multiplexing block of the at least one multiplexing block comprises a respective synchronization signal and a respective physical broadcast channel (PBCH), and the respective PBCH of each multiplexing block of the at least one multiplexing block comprises information indicating a respective beam; and
for each multiplexing block of the at least one multiplexing block, obtain a respective beam identifier based on the information indicating the respective beam;
wherein the information indicating the respective beam comprises: index information of the respective beam, a respective synchronization signal block time index (SS block time index), or a respective synchronization signal block index (SS block index).

12. The terminal device according to claim 11, wherein in each multiplexing block of the at least one multiplexing block the information indicating the respective beam is index information of a respective first orthogonal frequency division multiplexing (OFDM) symbol, and the one or more processors are further configured to execute the instructions to cause the terminal device to:
for each multiplexing block of the at least one multiplexing block, obtain the respective beam identifier based on the index information of the respective first OFDM symbol and a number of a respective antenna port for receiving the respective first OFDM symbol.

13. The terminal device according to claim 11, wherein:
in each multiplexing block of the at least one multiplexing block the information indicating the respective beam comprises index information of a respective first orthogonal frequency division multiplexing (OFDM) symbol; and
the one or more processors are further configured to execute the instructions to cause the terminal device to:
    for each multiplexing block of the at least one multiplexing block, obtain the respective beam identifier based on the index information of the respective first OFDM symbol, a number of a respective antenna port for receiving the first OFDM symbol, a respective frame number of the respective radio frame of the one or more radio frames, and a respective subframe number of a respective subframe in which the respective first OFDM symbol is located.

14. The terminal device according to claim 11, wherein:
in each multiplexing block of the at least one multiplexing block the information indicating the respective beam is index information of the respective multiplexing block; and
the one or more processors are further configured to execute the instructions to cause the terminal device to:
for each multiplexing block of the at least one multiplexing block, obtain the respective beam identifier based on the index information of the respective multiplexing block, a number of a respective antenna port for receiving a first orthogonal frequency division multiplexing (OFDM) symbol, a frame number of a respective radio frame of the one or more radio frames, and a respective subframe number of a respective subframe in which the respective first OFDM symbol is located.

15. The terminal device according to claim 11, wherein each multiplexing block of the at least one multiplexing block comprises one respective primary synchronization signal and one respective secondary synchronization signal.

16. A network device, comprising:
one or more memories configured to store instructions; and
one or more processors coupled to the one or more memories, wherein the one or more processors are configured to execute the instructions to cause the network device to:
generate at least one radio frame, wherein each radio frame of the at least one radio frame comprises at least one multiplexing block, each multiplexing block of the at least one multiplexing block comprises a respective synchronization signal and a respective physical broadcast channel (PBCH), and the respective PBCH of each multiplexing block of the at least one multiplexing block comprises information indicating a respective beam; and send the at least one radio frame generated to a terminal device;

wherein the information indicating the respective beam comprises: index information of a respective first orthogonal frequency division multiplexing OFDM symbol, index information of the respective multiplexing block, index information of the respective beam, a respective synchronization signal block time index (SS block time index), or a respective synchronization signal block index (SS block index).

17. The network device according to claim 16, wherein a first multiplexing block of the at least one multiplexing block is sent to the terminal device using a first beam.

18. The network device according to claim 16, wherein in each multiplexing block of the at least one multiplexing block the respective PBCH and the respective synchronization signal are frequency-division multiplexed or time-division multiplexed.

19. The network device according to claim 16, wherein in each multiplexing block of the at least one multiplexing block the respective synchronization signal comprises a respective primary synchronization signal and a respective secondary synchronization signal, and the respective primary synchronization signal and the respective secondary synchronization signal are time-division multiplexed.

20. The network device according to claim 16, wherein a first radio frame of the at least one radio frame comprises a plurality of multiplexing blocks, at least two of the plurality of multiplexing blocks are sent using different beams.

21. The network device according to claim 16, wherein each multiplexing block of the at least one multiplexing block comprises one respective primary synchronization signal and one respective secondary synchronization signal.

* * * * *